3,531,418
EN MASSE ENCAPSULATION PROCESS
Gene O. Fanger and Robert E. Miller, Dayton, Ohio, and Richard G. McNiff, Kokomo, Ind., assignors to The National Cash Register Company, Dayton, Ohio, a corporation of Maryland
No Drawing. Filed Aug. 18, 1965, Ser. No. 480,770
Int. Cl. A61k 9/04; B01j 13/02; B44d 1/09
U.S. Cl. 252—316                                                    5 Claims

ABSTRACT OF THE DISCLOSURE

A process is disclosed for manufacturing minute capsules, en masse, in a liquid manufacturing vehicle wherein only a single kind of polymeric capsule wall-forming material is deposited from solution onto dispersed particles of capsule core material by cooling the solution of polymeric material below a critical liquid-liquid phase separation temperature. The disclosed process utilizes, as an encapsulating system, only a single kind of polymeric material which is soluble, above a certain critical temperature, in a selected "poor" solvent system. At temperatures slightly below the critical temperature, the polymeric material emerges from its initial solution to deposit, as a separate, polymer-rich, liquid phase, onto intended capsule core entitles to produce capsules. At lower temperatures, the deposited polymeric capsule wall material becomes rigid and self-supporting. No phase-separation-inducing agents are utilized in the disclosed process.

---

This invention relates to minute en masse encapsulation of particles of material effected by temperature change and agitation of a single polymeric material and solvent(s) therefor which, at a certain temperature and below, form two immiscible but compatible solution phases, a lesser one of the two phases being richer in the polymeric material and dispersible in the second phase. This two-phase system can be established in two ways— first, the preferable way, by causing a completely homogeneous solution phase to separate into two liquid solution phases by cooling below a critical point, and, second, by heating a mixture of polymeric material and suitable solvent(s) therefor to a point where two solution phases, as described, form. Obviously, the invention is practiced in a temperature range below the boiling point and above the freezing point of the solvent(s).

The rich liquid phase (phase "A") may be considered as containing the less-soluble portion of the total of the polymeric material content of the system and may be dispersed in the vehicle (phase "B") together with the particles of material to be encapsulated by agitation, as by stirring. Due to the agitation of the system, the dispersed phases—that is to say, the dispersed particles of the rich solution and the partciles of material to be encapsulated—collide, which results in a deposit of the polymer-rich liquid droplets on said particles individually to form a liquid wall-like layer of the rich liquid solution phase about each particle. The wall-like layer on each of the thus-formed embryonic capsules is shrunken and made firm my continuing agitation of the system while the temperature of the system is being lowered, whereupon, by solvent loss from the walls, as the polymeric material becomes less soluble, the polymeric material deposit progressively becomes rigid and solid to a point where the embryonic capsules are stabilized in a finished state, so that they may be removed from the liquid system, as by decantation, filtering, centrifuging, and the like.

The system of two phases can be established with one polymeric material and one solvent liquid, without heating of the system to a temperature at which a homogeneous solution is formed, by bringing a mixture of the polymeric material and the solvent to a temperature just below the critical temperature, the less soluble molecule species being dissolved in one part of the solvent as a polymer-rich phase of minor volume, and the rest of the polymeric material molecule species, which are more soluble, being in solution in a minor concentration with respect to the rest of the solvent in the system.

The critical temperature may even be the boiling point(s) of the solvent(s).

The invention employs non-ideal organic solvents for the chosen polymeric material, to form an eligible pair to practice the invention, a non-ideal solvent being one in which the polymeric molecules are not completely relaxed.

The novelty and the utility of this invention reside in the facts that it is a simple process and that no foreign material substance is required to be introduced into the system to induce, to cause, or to establish the two-phase solution—the temperature adjustment of the system being the sole motivating cause for the two-phase formation. It is to be understood that the firming of the liquid walls is due to solvent expulsion (or, looking at it another way, due to the solvent's becoming less effective) and to the consequent shrinkage of the polymeric material film, and not to congealing, and that complete hardness of the deposited polymeric material can be achieved by cooling, although other aiding forms of hardening the wall material, such as evaporation of the solvent and cross-linking of the polymeric material, may be resorted to in addition to cooling. Such "aiding" forms of hardening are of an auxiliary nature and do not go to the essence of the invention.

In the sense that the vehicle consists solely of polymeric material and solvent(s), it is a binary system (or two-way system), as distinguished from other systems, which employ an added polymer non-solvent material agent (a third necessary ingredient) either to induce the phase separation, to cause the phase separation, or to maintain phase separation, such added agent material commonly being a non-solvent liquid with respect to the polymeric material. Such phase-separation-inducing, -causing, and -maintaining agents constitute foreign substances which find their way, in part, into the embryonic capsule walls and must be tolerated or removed. Among the known processes used before the advent of this invention, the step of cooling has been a factor in the liquid-liquid phase separation of a homogeneous solution of polymeric material, but in each of such prior instances a foreign substance (aiding agent or inducing agent) also was used and was essential to the operability and success of those known processes. The foreign substance often ends up, in part, in the walls of the finished capsules and is either left there or removed, and, if left there or even if removed, leaves an effect, either chemical or physical, on the wall structure. These foreign materials may be intolerable in capsules intended for ingestion for nutritional or medicinal purposes, they may interfere with the physical strength of the capsule walls in one way or another, they may cause porosity or coloration of the capsule walls, or they may have someunwanted effect on the encapsulated material.

The process, while still maintaining its binary phase status, may make use of a combination of two or more solvents for the polymeric material, and this is to be distinguished from the prior-art processes, in which a second liquid (a "solvent" liquid) is used to aid in phase separation, where the "solvent" liquid is miscible with the solvent for the polymeric material but is not itself a solvent for the polymeric material even though it may find its way into the deposited solution of the polymeric material by entrainment, having been dissolved with the solvent vehicle for the polymeric material. Any such residual entrained aiding liquid mechanically interferes with the complete film formation of the deposited polymeric material and in some cases leaves the rigid capsule walls permeable to passage of fluids (liquids or gases).

It has been noted that, in the event a particular polymeric material in homogeneous solution with a "poor" solvent for it does not readily go through and maintain a binary liquid-liquid phase state for a useful period of time or over a useful temperature range, in emerging from the unitary homogeneous solution state on cooling, the addition of a small amount of a second solvent, which is a "better" solvent for the polymeric material, brings about a condition in which the temperature range at which the liquid-liquid state exists is broadened in terms of temperature, so that the condition need not be controlled as critically, with regard to temperature, as otherwise might be the case. Such mixture of solvents is considered a single solvent for the polymeric material within the terms of this disclosure, as each contributes its part to the solvent function upon the polymeric material, in addition to the two solvents' being mutually miscible. This choice of a single solvent or two solvents is indicated as "solvent(s)."

The process preferably is carried on with the end point temperature (that is, the temperature at which walls have properties desired for end use) being room temperature (20 to 25 degrees centigrade) or slightly above, so that the manufacturing may be carried on in a "living-temperature" environment, and so that the capsules may be acclimated to normal room temperature if the polymeric material of the walls or the capsule contents are sensitive in that respect. Such room-temperature endpoint may not be desirable for some purposes, in which case the pair of materials constituting the single solvent(s) system is chosen accordingly for different operating conditions as far as manufacturing environmental temperature is concerned. Where there is a mixture of two polymer solvents and associated polymeric material to be formed into a binary solution system by heating (termed establishing a system from a mixture instead of a homogeneous solution), the end point preferably is in the 20-to-25-degree-centigrade range, but for special purposes may be outside that range.

It will be easily recognized that the process is naturally adapted as a "recycling" process, in which the same solvent material is used over and over, the solvent being recoverable by decantation, by filtering, or by recovering the vapors of the solvent if it is of an evaporable type, as is usually the case. To distinguish the binary system of this invention from the prior-art patented encapsulation systems involving phase separation of homogeneous liquid systems, or establishing the two solutions from a mixture, involving more than two species in the solvent system, one being of a nature "foreign" to the wall material in that it is not a solvent for it to "aid" the phase separation, a list of representative issued patents is given, together with at least one of the "foreign" materials indicated in each disclosure to "aid" in the generation of a liquid-liquid phase separation condition.

U.S. Pat. No. 2,800,457—Green et al.—a material to adjust the pH of the system plus a second polymeric material are used as "aids."

U.S. Pat. No. 2,800,458—Green—a salt plus a pH-adjusting material are used as "aids."

U.S. Pat. No. 3,041,289—Katchen et al.—a second and a third polymeric wall-forming material plus material to change the pH of the system are used as "aids."

U.S. Pat. No. 3,043,782—Jensen—a pH-adjustment material is used as an "aid."

U.S. Pat. No. 3,069,370—Jensen et al.—addition of a "solvent" liquid is used as an "aid."

U.S. Pat. No. 3,116,206—Brynko et al.—a pH-adjustment material is used as an "aid."

U.S. Pat. No. 3,155,590—Miller et al.—a rubber-like polymeric material which is a non-solvent for the wall material is used as an "aid."

U.S. Pat. No. 3,173,878—Reyes—a liquid which is a non-solvent for the polymeric material is used as an "aid."

British Pat. No. 907,284—The National Cash Register Company—a polymeric material solution is used as an "aid."

These "aiding" materials are necessary evils, being undesirable from an economic standpoint, in that they spoil the solvent for reuse without quantitative and qualitative readjustment, in that they contaminate the capsule wall material, and in that they add to the material cost and the processing cost of making the capsules.

The simplicity of the novel process of this invention is a distinctive advance over the art as disclosed by previous workers and investigators in the field. Applicants discovered that in a certain set of circumstances involving particulate material to be encapsulated and a pair of materials consisting of polymeric film-forming material and a poor polymeric material solvent system for it, capsules are formed by mere temperature adjustment and stirring without the need of a foreign "aiding" substance to aid the liquid-liquid phase separation, and applicants studied and enlarged upon this discovery to a point where the same type of liquid-liquid phase separation would predictably occur with various ascertainable pairs of solvent/polymeric materials—that is to say, different pairs of solvent and polymeric materials eligible, by being filmformers, for forming walls of capsules.

Certain criteria have been found by which pairs of solvent and polymeric materials may be selected for use in practicing the invention. The objective is to provide a system comprising a pure liquid solution phase rich in wall-forming polymeric material and dispersible in a residual less concentrated solution comprising only the same solvent and the same polymeric material. For wall material, a film-forming polymeric material which is a solid at the temperature at which the capsules are to be used is chosen. The polymeric wall material chosen must be paired with a "poor" solvent for it, and together they form the separated polymeric-material-rich liquid. On the cooling of the system, the rich solution phase progressively loses solvent until the polymeric material hardens. In the usual system, the polymeric material and the solvent are completely soluble with each other to form a clear solution below the boiling point of the solvent. In some systems, the two phases must be established without a complete solution occurring at the solvent boiling point. In such instances, the two phases are established by heating to the boiling point. The test for eligible pairs of solvent and polymeric material is to determine visually that two solutions are formed by heating to a temperature limited by the boiling point at the high end of the range and the rich phase hardening by the time the system is cooled to the temperature of intended capsule use. A candidate pair of materials capable of forming complete solution may be tested by agitating a clear solution of them while cooling it below the temperature at which the polymeric material barely dissolves completely into the clear solution state. If the materials are suitable, the two-phase solution forms with a few degrees drop in temperature. The separated phase, when it forms, may be broken into droplets and dispersed in the residual vehicle by agitation, which results in the clouding of the system as viewed by transmitted light. A microscopic examination of the dispersed particles causing the clouding will prove whether they are in liquid state. The same "cloudiness" test serves for systems formed by heating. The "poorness" of the solvent is a factor in insuring the liquidity of the separated phase. As between two otherwise eligible solutions having the solvent and the polymeric material in the same concentration but different in polymeric material content as to kind, that solution having the lowest viscosity is the more eligible for use in practicing this invention, as it indicates that the polymer entities have not been fully relaxed and that the solvent is a "poor" one for it. As between two samples of a polymeric material having different molecular weight distributions and their viscosity behavior in solution in the same solvent at the same concentration and temperature, the pair exhibiting the lower viscosity is to be chosen, as it is composed of species that are less soluble than the species of the more viscous pair. As this elimination proceeds with various pairs of candidate materials, it will become apparent which are the more eligible candidates for practicing the invention. Further, as a second informational criterion, as regards molecular weight range of the same polymeric material (that is to say, the range of species of molecules within the kind of polymeric material used), there should be chosen as eligible materials those with a broad band of weight species rather than those with a narrow band of weight species, such property of broad-bandedness tending to the formation of the two liquid phases with the least difficulty with respect to the control of the temperature in cooling a solution of them progressively. The poor solvent should become an "increasingly poorer" solvent for the polymeric material as the solution of them is lowered in temperature progressively. The polymeric material solution of the dispersed phase, in addition to forming a deposited layer on the dispersed particles of intended nucleus material, must maintain a continuous film characteristic on elimination of the solvent therefrom, to a point where the deposit becomes firm enough (hard in the sense of being physically self-supporting) to withstand gravitational and environmental forces encountered when removed from the liquid. The polymeric material must be a good film-former as it emerges from its state of solution where the interaction between the polymeric material molecules and the solvent is minimal—that is to say, wherein the polymeric material molecules are not wholly relaxed.

As regards the selection of capsule nucleus material, the particles thereof must be of the desired minute size and shape and must be substantially immiscible with the rest of the system and compatible therewith. The nucleus material also must be wettable by the dispersed separated rich solution phase of the system, but it is a well-known fact that such separated polymer-rich solutions have high wetting ability, and the ineligible materials in this respect are very few in number.

Eligible for encapsulation as solids are particles of material such as, for example: aspirin, sodium chloride, sodium sulfate, potassium chloride, amphetamine sulfate, gelatin, mannitol, dextro-methorphan hydrobromide, ammonium dichromate, acetyl para-amino phenol, sodium bicarbonate, cellulose acetate hydrogen phthalate, polyvinyl pyrrolidone, glyceryl guiacolate, carboxy methylcellulose, magnesium hydride.

Also eligible for encapsulation as liquids are water, aqueous solutions, water-like liquids, and any polar liquid which is immiscible with, compatible with, and dispersible in the vehicle.

The examples of materials to be encapsulated have been given to show variety and are not to be deemed to limit the selection thereof.

The criteria and the means for selecting materials for use in the process having been outlined, examples will be given of specific systems with actual preferred proportional amounts of materials, the preferred form of the invention (Example III) being directed to the encapsulation of a coloring material useful as a test material which indicates the degree to which the capsule wall material is pervious to extracting liquids.

EXAMPLE I

The invention was first reduced to practice with ethyl cellulose of high ethoxyl content and a viscosity of 22 centipoises (at a 5% concentration, by weight, at 25 degrees centigrade in an 80:20 toluene:ethanol solvent), dissolved in cyclohexane in a concentration of 4%, by weight. The encapsulated material was magnesium hydride in finely particulate (20 to 40 microns) form. Specifically, two grams of high-ethoxyl-content ethyl cellulose having an ethoxyl content of 47.5% to 49.0% and the specified viscosity was dissolved in 98 grams of boiling cyclohexane until a clear solution was formed. This, of course, is the invention carried out where the polymeric material forms a homogeneous solution with the solvent liquid and the two phases are caused by cooling. The so-formed solution was a "poor" solution, in which the polymeric material molecules were not completely relaxed. The magnesium hydride particles, in an amount of eight grams, were stirred into the system, and, with stirring continued, the system was left to cool to room temperature, during which period the rich phase emerged and formed walls around the particles. This process formed capsules of good wall structure with a slight tendency to thereafter aggregate together into small visible lumps each containing a myriad of individual capsules. The wall structure of each individual capsule is complete in itself and represents a structure of progressive molecular deposit formation, the aggregation believed to be an end result of the deposit of the tailings of the phase separation.

EXAMPLE II

This example is like Example I except that 147 grams of cyclohexane (instead of 98 grams) was used in the system with two grams of the same kind of ethyl cellulose. The capsules which resulted from the cooling of this system from the boiling temperature of cyclohexane had better-formed walls than the capsules of Example I. This indicates that the proportion of polymeric material to solvent has some bearing upon the wall deposit and should be taken into account when different relative proportions of the same solvent and polymeric materials are used. Empirical testing here is determinative of the best proportions for the desired result.

EXAMPLE III

In this example, which is the preferred embodiment, a 3%, by weight, solution of ethyl hydroxyethyl cellulose (Brand "EHEC" sold by Hercules Powder Company) having a viscosity of 125 to 250 centipoises, as determined in a 5% solution by weight of it in a solvent mixture of 80 parts of toluene and 20 parts of ethanol at 25 degrees centigrade. The ethyl hydroxyethyl cellulose is dissolved in a mixture of hydrocarbon solvents consisting of a 1-to-1 ratio, by weight, of "Shell Sol 140" and "Shell Sol 72." "Shell Sol 140" is a petroleum distillate having a specific gravity of .7852 at 60 degrees Fahrenheit and in composition consists of 7% aromatics, 42% naphthenes, and 51% paraffins. "Shell Sol 72" is a petroleum distillate having a specific gravity of .761 at 60 degrees Fahrenheit and is made up of 100% paraffins. Two parts, by weight, of finely ground ammonium dichromate is added to the system for each weight of polymeric material. The system is stirred and heated until complete solution of the polymeric material is just achieved, as indicated by a clarity of the stirred solvent-polymeric material mixture in the absence of the ammonium dichromate. With continued stirring, the temperature of the system is allowed slowly to drop to room temperature, hard capsule walls forming around the particles of the ammonium dichromate, the wall thickness being proportional to the amount of polymeric material used as compared to the surface area of the particles receiving the deposit, such area being a function of particle size and number of particles.

EXAMPLE IV

In this example, the same polymeric material was used in the same amount with relation to solvent as in Example III, but the solvent was a mixture of "Shell 72" in an amount of 37½% and hexane in an amount of 62½%, by weight. The nucleus material was finely-divided aspirin used in an amount of seven parts to each part of the ethyl hydroxyethyl cellulose. The heating and cooling steps of Example III were followed.

EXAMPLE V

In this example, the encapsulation of water droplets was achieved by dispersing 7%, by weight, of water in a 3% concentration solution of polytrifluoroethylene in methyl isobutyl ketone, at 80 degrees centigrade, to a drop size to yield capsules of approximately 100 microns in diameter. The dispersion was cooled to room temperature with the water droplets individually encapsulated. These capsules tended to aggregate into assemblies measuring 500 to 2,000 microns in size.

EXAMPLE VI

In this example, a capsule-making system was established without the formation of a homogeneous solution of the selected polymeric wall-forming material and solvent at any time. A two-phase solution system, each phase being of the same kind of polymeric material and solvent, was established at a temperature approaching the boiling point of the solvent, which temperature was too low to form a homogeneous solution. The solvent was a mixture of cyclohexane and hexane, the polymeric material was an ethyl cellulose of high ethoxyl content (Dow 100—47.5% to 49.0% ethoxyl), and the capsule content material was powdered (60-mesh, or 250-micron, sieve openings) N-acetyl-p-aminophenol, which is an analgesic termed acetaminophen for trade purposes, and the name of which is sometimes shortened to APAP.

In a typical system, the following are the weight relations in grams:

Ethyl cellulose (45.5% to 49.0% ethoxyl) -------- 10
Cyclohexane --------------------------------- 200
Hexane -------------------------------------- 100
N-acetyl-p-aminophenol (60-mesh) -------------- 60

This mixture was heated to boiling and with stirring was allowed to cool to room temperature. The capsules were recovered by filtering and air-drying to allow the solvent to disappear completely.

Acknowledgment is made of the disclosure of application for United States Letters Patent Ser. No. 329,887, filed Dec. 11, 1963, now U.S. Pat. No. 3,341,416, by Jerrold L. Anderson, Gary L. Gardner, and Noble H. Yoshida, in which aspirin was encapsulated from a solution of ethyl cellulose in cyclohexane, but as aided by a third substance—polyethylene. The present invention is decisively different, in that the third ingredient, found necessary heretofore for accomplishing the encapsulation of particulate material such as aspirin, is not now necessary, and the present invention provides a superior product by the elimination and absence of the surplus third ingredient, and further provides for easier recycling of the system by mere addition of more aspirin and film-forming wall material to make up for that lost in capsule formation.

The testing of suitable pairs of solvents and polymeric materials according to the directions heretofore given is well within the skill of a person familiar with the art of making polymeric material solutions, and, in carrying on the practice of the invention, there have been found a number of pairs of materials differing from those set forth in the examples but behaving in a similar manner with accountable appropriate differences in characteristics of the wall material from a chemical and physical standpoint, and among these pairs are the following:

Nitro-cellulose dissolved with di-propylketone polystyrene (Monsanto "2020") dissolved with methyl cyclohexane A vinyl chloride-maleic ester copolymer ("Exon" 471 Firestone Plastics Co.) dissolved with tetrahydro naphthalene The foregoing examples have been given not only with respect to the encapsulation of solid materials which are not of a migratory nature, as are fluids of liquid state, but also with respect to the encapsulation of a polar liquid (water), which is represented by water solutions, and water-like materials, which are liquids immiscible with the organic liquid vehicle of the system. Water of itself in the encapsulated state is difficult to retain for long periods in the atmosphere, and, when water or aqueous liquids containing water are encapsulated, the capsules should be retained in the vehicle until just before use.

What is claimed is:
1. A process for making individual minute capsules en masse, including the steps of
    (a) providing a liquid solution system of a pair of materials, said system consisting of only a single kind of polymeric film-forming material and a liquid organic solvent, in which solvent the polymeric material is but poorly soluble because of the lack of interaction between the polymeric material molecules and the molecules of the solvent, the solvent being selected so as to become progressively a poorer solvent for the polymeric material as the temperature of the solution is lowered, and the polymeric material being selected so as to lose solvent and eventually become shrunken and hard as it comes progressively out of the solution on cooling of the solution;
    (b) lowering the temperature of the solution of step (a) to a temperature where a condition of partial solution of the polymeric material occurs in that two solution phases are formed which are mutually immiscible but share the solvent in common, one phase being a polymeric-material-poor liquid-solution phase and the other phase being a polymeric-material-rich liquid-solution phase, the polymeric-material-rich liquid-solution phase being dispersible, by agitation, in the polymeric-material-poor liquid-solution phase;
    (c) stirring a selected particulate material substantially immiscible with the liquid solution system, into the system of (a) under modification by step (b) while the dispersible polymeric-material-rich liquid-solution caused by step (b) is in existence, to form tiny droplets of the polymeric-material-rich liquid-solution which deposit on each of the particles as a layer to form a dispersed phase of liquid-walled capsules; and
    (d) lowering the temperature of the system resulting from steps (a), (b), and (c), with continued agitation, as by stirring, to form firm-walled capsules by causing the solvent to separate from the deposited polymeric material.

2. A process for making individual minute capsules en masse, including the steps of
    (a) providing a solution of only a pair of materials, said solution consisting of a single kind of polymeric film-forming material and a liquid organic solvent at a temperature above which they first form a clear homogeneous solution and in which solvent the polymeric material is poorly soluble because of the lack of interaction between the polymeric material molecules and the molecules of the solvent, the solvent being selected so as to be a poorer solvent for the polymeric material as the temperature of the solution is lowered, and the polymeric material being selected so as to lose solvent progressively and eventually become hard after it emerges out of the homogeneous solution because of continued drop in temperature;
    (b) lowering the temperature of the solution of step (a) to a temperature where a condition of partial solution of the polymeric material occurs in that two solution phases are formed which are mutually immiscible but share the solvent in common, one phase being a polymeric-material-poor liquid-solution phase and the other prase being a polymeric-material-rich liquid-solution phase, the polymeric-material-rich liquid-solution phase being dispersible, by agitation, in the polymeric-material-poor liquid-solution phase;

(c) stirring a selected solvent-immiscible particulate material in the system produced by step (b) while the dispersible polymeric-material-rich liquid phase is in existence, to form tiny droplets of the rich liquid phase, which droplets deposit on the particles of the particulate material to form liquid-walled capsules; and (d) further lowering the temperature of the system obtained by steps (b) and (c), with continued agitation, to form firm-walled capsules.

3. A process for making capsules, including the steps of (a) establishing a homogeneous liquid solution consisting of a liquid organic solvent and only a single kind of film-forming polymeric material characterized by being unstable on cooling with respect to the ability to remain homogeneously dissolved together, the solvent being a poor, liquid, organic solvent for the polymeric material, the polymeric material being firm and hard in undissolved state, and the solvent becoming a poorer solvent for the polymeric material as the temperature of the solution is lowered;

(b) progressively lowering the temperature of the established solution (a) to and beyond a critical temperature whereupon two liquid phases are formed, one liquid phase being a minor phase as to volume and being rich in the polymeric material, and the other liquid phase being a major phase as to volume and being rich in solvent, the minor phase giving up solvent progressively to the major phase as the temperature is lowered and, while the minor phase is in being in a liquid state;

(c) stirring with the system finely-divided intended nucleus material that is immiscible with the rest of the system but is wettable by the minor phase, which minor phase is dispersed as droplets in the major phase together with the nucleus particles to form an interspersion, the collision between the particles of the nucleus material and the droplets of the minor phase resulting in the formation of liquid-walled capsule; and (d) lowering the temperature of the resulting system to form individual firm-walled capsules, which walls, without more, as the temperature falls, become hard by becoming progressively less soluble in the solvent.

4. A process of encapsulating particles of material to be protected in walls of polymeric material, including the steps of (a) establishing a composition consisting of only a single kind of polymeric film-forming material having a wide range of molecular weight species and a poor liquid organic solvent therefor in that the solvent will not relax the polymeric material molecules completely but becomes a better solvent with a rise in temperature and a poorer solvent with a fall in temperature;

(b) adjusting the temperature of the composition established by (a) to a point where a condition of partial solution of the polymeric material occurs in that two solution phases are formed that are immiscible but share the solvent in common, one phase being of greater volume and less concentrated in polymeric material content than the lesser volume phase, and the lesser phase being dispersible in the greater volume phase;

(c) stirring the temperature-adjusted composition (b) to disperse the lesser volume phase as tiny droplets in the greater volume phase;

(d) while the stirred composition is still at the adjusted temperature, having present therein the particles of material to be protected, which particles are substantially immiscible with the composition, whereby they contact and are coated by the droplets; and (e) lowering the temperature of the composition that contains the droplet-coated particles to an intermediate point at which the polymeric material solution coated on the particles becomes more concentrated by solvent loss and finally beyond the intermediate point to where the walls become firm enough for use.

5. A process of making minute capsules en masse, including the steps of (a) forming, above a predetermined temperature, a system liquid solution containing particles of material, said particles being substantially immiscible with the liquid solution and intended to be the capsule nucleus material, the solution consisting of a single kind of organic polymeric film-forming material with a wide band of molecular species differing as to solubility and an organic liquid solvent that is a poor solvent for the polymeric material, which is barely completely solvent at the predetermined temperature and becomes a poorer solvent as the temperature decreases from the predetermined temperature, first causing the less-soluble species to lose solvent and emerge within the solution as a liquid separate phase, the separation progressing with the fall in temperature to include more-soluble species until an equilibrium is reached, leaving most of the polymeric material emergent from the original solution, the molecules of the emergent phase themselves progressively emerging as a solid phase; and (b) progressively lowering the temperature of the system of step (a) to a temperature where a condition of partial solution of the organic polymeric material occurs in that two solution phases are formed which are mutually immiscible but share the solvent in common, one phase, the liquid emergent phase, being a polymeric-material-rich liquid-solution phase containing the less-soluble species and the other phase being a polymeric-material-poor liquid-solution phase containing the more-soluble species, the polymeric-material-rich liquid-solution phase being dispersible, by agitation, in the polymeric-material-poor liquid-solution phase;

(c) agitating the system of step (b) to intersperse the particles and the liquid emergent phase, which particles thereby become coated with the liquid emergent phase to form embryonic liquid-walled capsules; and (d) further cooling the agitating system of step (c) to solidify the emergent phase and yield solid-walled capsules.

References Cited

UNITED STATES PATENTS 3,155,590  11/1964  Miller et al. _____ 252—316 X
3,317,434  5/1967  Veis et al. _____ 252—316

RICHARD D. LOVERING, Primary Examiner

U.S. Cl. X.R.

117—100; 424—32, 33, 35